UNITED STATES PATENT OFFICE.

JAMES P. A. McCOY, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

PLASTIC COMPOSITION AND ARTICLES FORMED THEREFROM.

1,425,784.     Specification of Letters Patent.     Patented Aug. 15, 1922.

No Drawing.     Application filed August 30, 1920. Serial No. 406,777.

*To all whom it may concern:*

Be it known that JAMES P. A. McCoy, a subject of the King of Great Britain, residing at Milwaukee, in the county of Milwaukee and State of Wisconsin, has invented a certain new and useful Improvement in Plastic Compositions and Articles Formed Therefrom, of which the following is a specification.

This invention relates in general to the manufacture of plastic compositions and articles formed therefrom, and it has particular relation to insulating compositions and articles molded therefrom.

It is well known that bakelite, which is a condensation product of phenol, has very desirable qualities, both dielectric and mechanical, as a material for molding and as an electrical insulating material or a binder therefor. Further, bakelite is capable of imparting these qualities to an article or a composition in which it is present, independently of whether the final material is a substance for impregnating or coating articles to be insulated, or a molded article.

In preparing or working bakelite, especially in the intermediate stage, for use as a material of the final desired product, it has a tendency to harden or decrease in plasticity in a relatively short time, thus impairing its efficiency and desirability as a material for molding or for mixture with other ingredients of a final composition wherein the bakelite functions as a binder for a more or less inert filling material.

An object of this invention is to provide a novel material or a binder for the ingredients of an insulating composition, which imparts desirable mechanical and dielectric qualities to the final material or article, whether it be in form of a molded article or a more or less plastic and pliable substance such as may be useful for providing a more or less tacky or rubber-like coating.

The preferable materials for initial association with bakelite as set forth above are resinous products of the partial or complete polymerization, but preferably polymerizable products, that is, partially polymerized products, of certain aromatic carbon compounds, especially indene, cumaron and their isomers. These products are described in U. S. Patent No. 1,300,218, granted to me April 8, 1919.

Indene and cumaron are readily polymerized to a degree by means of sulfuric acid which, when added to a solution of either or both of these substances, forms a partly polymerized resinous material. In the case of coal tar distillate, the substance is a mixture of paraindene and paracumaron. The partly polymerized resins are readily soluble in many of the usual organic solvents, including coal tar oils such as anthracene oil.

Paraindene and paracumaron, either separately or mixed in any proportions, are, in themselves, excellent binders for the manufacture of electrical insulating material and are adapted for use in both hot and cold molding processes. Further, the proportions in which these substances may be mixed with fillers may be varied to any desired degree, if the treatment to which the molding mixture is subjected is correspondingly altered. The partial and complete polymerization products of the isomers of indene and cumaron may be likewise suitable for use, either singly or combined.

A resin of the character described is considerably cheaper than bakelite, although not of as high insulating efficiency, thus causing the dielectric strength of the final insulating product to be somewhat below what it might be if bakelite alone, in the required amount, were used as the binder. Hence, the proportions of bakelite and the resin are determined to a great extent by the required insulating value of the final material. In most instances, the insulating and mechanical properties of a mixture of bakelite and the resin satisfactorily meets any required mechanical and dielectric requirements. However, the increased facility with which the mixture of bakelite and the resin may be handled, due to inherent qualities of the latter as an ingredient, more than compensates for any decrease in insulating qualities.

In any case, the substitution of a certain amount of this resin for a portion of the bakelite normally used has an extremely desirable effect in increasing the stability of the binder as a plastic material without appreciably decreasing the binding qualities of the mixture or the mechanical strength of an article molded from a composition in which such mixture is present.

A desirable final product of molded material may be obtained in accordance with general features of this invention by utilizing a composition made up of a mixture of approximately 90% of ground asbestos fibers, a binder consisting of about 5% of a mixture of bakelite and partially polymerized paraindene, paracumaron or a mixture of the latter two substances, and about 5% of a polymerizable vegetable oil, such as raw China wood oil. The proportions of bakelite to the polymerizable resin in the binder mixture may be as low as possible in order to obtain the required insulating value of the final molded product. The ingredients should be mixed into a pulp or sludge with a suitable solvent, such as benzol, or preferably a mixture of solvents graded as to boiling points, and preformed while cold in a mold of the desired shape but of somewhat larger size. The material may be heated in the preforming mold at a relatively low temperature to drive off the solvent, after which the preformed articles are given a final molding and heat treatment in hot molds to effect the substantially complete polymerization of the resinous binder and the vegetable oil.

The China wood oil used as an ingredient of the composition, in addition to replacing a portion of the solvent required, has the characteristic of increasing in volume upon polymerization, the latter being ordinarily completed during the final baking of the molded article; and this oil, if present in the proper quantity, may exactly compensate for the shrinkage due to the expulsion of the binder solvent from the material. The filling material may be chosen in accordance with the desired physical qualities of the final product.

An insulating composition containing a mixture of bakelite and a resin of the character described herein is extremely useful as a more or less permanently plastic, tacky or rubber-like coating or paint for articles to be insulated. It possesses extremely desirable mechanical and dielectric qualities contributed by bakelite, and its handling during application and subsequent thereto is facilitated by the presence of the resinous material of the character described. Of course, in such a composition, the greater part of the filler used in material for molding is supplanted to any desired degree by varnish gum, pitch, asphalt, etc. and oil and solvent, depending upon the degree of fluidity desired during application and the hardness of the finished coating.

An advantage of using a partially polymerized substance of the character described is that a greater degree of fluidity or plasticity may be obtained with a somewhat less volume than if the completely polymerized substance were used. Again, the use of a partially polymerized substance as an ingredient of the binder where the mixture is to be molded and baked to form a durable molded article, contributes to a decided extent to produce a final article of a relatively close grained and dense structure, this advantageous feature probably resulting, at least to some extent, from the final polymerization of the cumaron or the like resin.

Any desired coloring pigment may be added to the mixture for the purpose of producing a color different from the natural color thereof.

It will be apparent that, in accordance with this invention, an insulating composition is produced having bakelite and a polymerizable resin of the character described as essential constituents; and this composition is possessed of desirable insulating and mechanical properties independently of whether the material is used as a composition for hot or cold molding, or for the preparation of a more or less plastic or rubber-like coating.

It should be understood that the invention claimed is not limited to the exact details or the specific combinations claimed, for it will be apparent that obvious modifications will be apparent to one skilled in the art.

It is claimed and desired to secure by Letters Patent:

1. An insulating composition, comprising bakelite mixed with a polymerizable resin.

2. An insulating composition, comprising a binder including a mixture of bakelite and a material containing one or more partially polymerized products of a group of substances including indene, cumaron and their isomers.

3. An insulating composition, comprising a filling material, and a binder therefor containing as essential elements bakelite mixed with a polymerizable resin.

4. An insulating composition, comprising a binder including as essential elements two substances one of which is a polymerizable resinous material capable of extending the plasticity or increasing the period of plasticity of the binder beyond that normally attainable with the other element alone as a binder.

5. An insulating composition, comprising a binder including bakelite mixed with a polymerizable resinous material capable of extending the plasticity or increasing the period of plasticity of said binder beyond that normally attainable with bakelite alone as a binder.

6. An insulating composition, comprising a filling material, and a binder therefor containing as essential elements a phenolic condensation product mixed with a polymerizable resinous material capable of extending the plasticity or increasing the period of plasticity of said binder beyond that normally attainable with said phenolic condensation product alone as a binder.

7. An insulating composition, including a polymerizable resin mixed with a phenolic condensation product.

8. An insulating composition, comprising a binder containing bakelite mixed with partially polymerized cumaron resin.

9. A composition of matter, comprising a binder containing bakelite mixed with a resinous material containing one or more polymerizable products of a group of substances including indene, cumaron and their isomers.

10. A composition of matter, comprising a phenolic condensation product mixed with a resinous material containing one or more partially polymerized products of a group of substances including indene, cumaron and their isomers.

11. A molded insulator, comprising a filling material, and a binder therefor produced from bakelite and a polymerizable resinous material capable of extending the plasticity or increasing the period of plasticity of said binder beyond that normally attainable with bakelite alone as a binder.

12. A molded insulator, comprising a filling material, and a binder therefor produced from bakelite mixed with a partially polymerized product of a group of substances including indene, cumaron and their isomers.

13. A molded insulator formed from bakelite mixed with polymerizable cumaron resin.

14. A molded insulator formed from a mixture of a phenolic condensation product and a resinous material containing one or more polymerizable products of a group of substances including indene, cumaron and their isomers.

15. A plastic or rubber-like insulating composition containing a mixture of bakelite and a polymerizable resin.

16. A plastic or rubber-like insulating composition, comprising a binder containing bakelite mixed with partially polymerized cumaron resin.

17. A permanently plastic insulating material containing a mixture of a phenolic condensation product and a polymerizable resinous material.

18. An insulating body produced from a mixture containing a phenolic condensation product and a polymerizable resinous product of a group of substances including indene, cumaron and their isomers.

19. An insulating body produced from a mixture containing a phenolic condensation product and polymerizable cumaron resin.

In testimony whereof, the signature of the inventor is affixed hereto.

JAMES P. A. McCOY.